United States Patent Office 3,701,761
Patented Oct. 31, 1972

---

3,701,761
TEMPERATURE CONTROL IN SUSPENSION POLYMERISATION
Yoshiro Ashina, Iwao Oshima, and Kazunori Sekine, Yokohama-shi, Japan, assignors to Nitto Kagaku Kogyo Kabushiki Kaisha (also known as Nitto Chemical Industry Co., Ltd.), and Mitsubishi Rayon Co., Ltd., both of Tokyo-to, Japan
Filed July 1, 1969, Ser. No. 838,085
Claims priority, application Japan, July 3, 1968, 43/45,876
Int. Cl. C08f 15/04, 15/22
U.S. Cl. 260—85.5 R          5 Claims

ABSTRACT OF THE DISCLOSURE

The polymerization temperature in suspension polymerization of a monomer mixture comprising styrene monomer and acrylonitrile monomer is so controlled that it does not exceed a predetermined level until a gel effect begins to develop and is thereafter left to rise, whereby a homogeneous copolymer is obtainable in a short polymerisation time.

---

BACKGROUND OF THE INVENTION

This invention relates generally to an improvement in suspension polymerisation wherein a polymerisation vessel of large capacity can be employed and through which a copolymer of styrene monomer and acrylonitrile monomer can be obtained in a short time without a sacrifice of its properties. The invention relates more specifically to polymerization temperature control in suspension polymerisation of a monomer mixture of said monomers wherein the polymerization temperature is controlled, until a gel effect is developed, so as not to exceed a predetermined level and, after the gel effect has developed, is left to rise.

In suspension polymerisation, efforts have been made to improve the so-called "space-time yield" by carrying out the polymerisation at higher temperatures which make removal of heat of reaction easier owing to greater cooling temperature difference and make reaction time shorter owing to acceleration of the reaction. However, polymerisation often has to be carried out at a temperature which is not a high as that desired because, among others, certain dispersants become less effective and because certain initiators become less effective at the higher temperature. In the case when dispersant becomes less effective during a polymerisation, suspension of monomer droplets cannot be kept stable, so that the polymer is produced in the form of extraordinary particles or a large mass of solid. A loss of activation of an initiator during a polymerisation is based on the fact that it decomposes without initiating substantial polymerisation and is called "a loss of initiator efficiency" or "a dead end phenomenon." In the case of suspension copolymerisation of styrene and acrylonitrile, in particular, it is very difficult to carry out the polymerisation at higher temperatures keeping the suspension stable and keeping a good initiator efficiency, because of the greater solubility of acrylonitrile in water and because of the low polymerisation rate of styrene.

Further, even though the optimum temperature and time of polymerisation are set, it is difficult to remove completely the heat of the polymerisation carried out in an industrial scale operation. Accordingly, the reactor must be limited in its capacity, and the polymerisation time must be lengthened.

In suspension polymerisation as well as bulk polymerisation, it is well known that the polymerisation rate is accelerated as the polymerisation proceeds owing to the increase in viscosity in the polymerisation system, such an acceleration being called the "gel effect." It has been reported that such an acceleration is found particularly in homopolymerisations of methyl methacrylate, styrene, and vinyl chloride. It is explained that this phenomenon occurs when the termination reaction is suppressed owing to the increase in viscosity in the polymerisation system. The removal of the heat of reaction has been a problem because of the abrupt evolution of heat.

The prior temperature control can be classified into two methods wherein (1) The reaction or polymerisation temperature is kept constant, and
(2) The jacket temperature is kept constant.

In the former method of control, the reaction temperature is usually kept constant but can be elevated for aging after the reaction has been substantially completed. In the latter method of control, the reaction temperature is elevated at the initial stage of the reaction. These methods of control, however, are not satisfactory, because the former entails an excessively long reaction time and because the operation according to the latter will often be impossible when the full elevation of temperature is not allowed.

It has now been found that the time required to complete a suspension polymerisation wherein the gel effect is developed and polymerization cannot be allowed to rise excessively can be shortened and a polymer can be obtained in uniform degree of polymerisation, if the polymerisation temperature is so controlled as not to exceed a predetermined level through cooling until the gel effect begins to develop and thereafter is left to rise owing to an acceleration of the polymerisation by the gel effect.

The term "gel effect" herein used has the conventional technical meaning. When the gel effect is developed at a certain point in the course of polymerisation carried out at a constant temperature, the reaction rate after the point is significantly higher than that prior to the point. For further details on the gel effect, reference is made to Tobolsky et. al., J. Am. Chem. Soc. 82, 1277 (1960).

A point at which the gel effect is developed, or after which the reaction rate becomes higher, is often found in the copolymerization of styrene monomer and acrylonitrile monomer when the conversion of monomer is in the range of 20 to 60%.

SUMMARY OF THE INVENTION

An object of this invention is to prepare copolymers of styrene monomer and acrylonitrile monomer having uniform degree of polymerisation within a short time.

It is another object of the invention to lighten the cooling load which is required in suspension polymerisation of the monomer mixture.

According to the present invention, briefly summarised, there is provided, in the suspension polymerisation of a mixture of the styrene monomer and acrylonitrile monomer, the art of controlling the polymerisation temperature to prevent its rise above a predetermined value by cooling until a gel effect begins to develop and permitting the temperature to rise after said gel effect has developed.

The nature, details, and utility of the invention will be more clearly apparent from the following detailed description commencing with general considerations and concluding with examples of practice constituting preferred embodiments of the invention.

DETAILED DESCRIPTION

Figure 1:
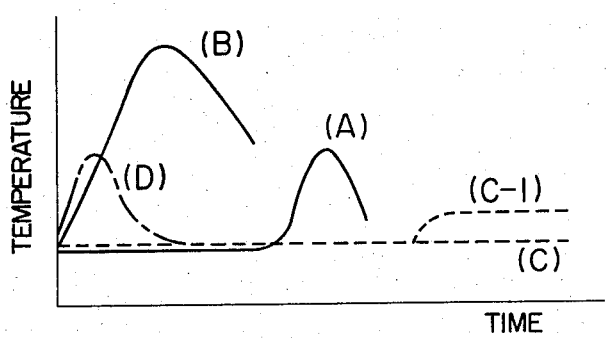
FIG. 1 is a graphical representation showing polymerisation temperature profiles plotted with temperature-time coordinates.

In FIG. 1, the polymerisation temperature profile of a process according to the present invention is shown by curve A. Polymerisation temperature profiles of processes according to prior temperature control technique known hereinbefore outlined under item (1) and (2) are also shown by curves C and C–1 and curve B. Curve C–1 shows that the polymerisation mass is aged at a higher temperature after the polymerisation has been substantially completed.

Curve A shows that the polymerisation temperature is so controlled as not to exceed the predetermined level or kept constant until the gel effect begins to develop by adjustment of temperature of cooling means such as a jacket of the polymerisation vessel. The polymerisation temperature is preferably kept as high as possible as permitted by the suspension stability and polymer yield desired. When a certain monomer conversion has been attained, the gel effect begins to develop, and the reaction is accelerated accordingly. If the coolant circulating in the cooling means is kept unchanged in flow rate and temperature, the polymerisation temperature rises owing to the heat evolved in the polymerisation mass and reaches its maximum value, thereafter decreasing.

Any temperature control can be practised after the gel effect has developed provided that it affords elevation of the polymerisation temperature due to the heat generated in the polymerisation mass by the gel effect. Therefore, circulation of the coolant can be kept unchanged or stopped, or the polymerisation mass can be kept in adiabatic condition. After the polymerisation temperature has reached its maximum value, it can be left to decrease or can be forced to decrease.

A surprising discovery we have made is that the polymer will be obtained in the form of truly spherical beads and there is no drop in polymer yield when polymerisation is carried out if the polymerisation temperature is elevated only after gel effect has developed. In the case where maximum polymerisation temperature is placed or established at the beginning of the course of polymerisation in a certain polymerisation system, the temperature profile of which is shown by curve D in FIG. 1, it is often observable that the suspension is destroyed, or made unstable or polymerisation is discontinued on account of deactivation of initiator. Even in such a polymerisation system, however, no trouble may be met in operation, and short reaction time, lightened load of reaction heat removal, easy temperature control, and uniform degree of polymerization can be attained if the maximum polymerisation temperature is established after the gel effect has been developed according to the present invention.

Figure 2:
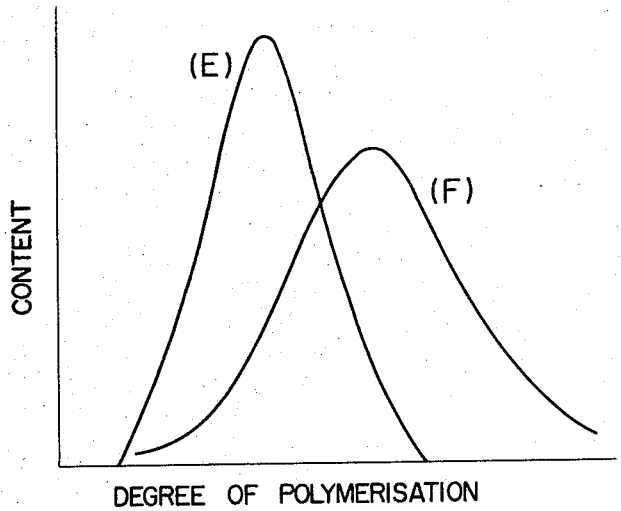
FIG. 2 is a graphical representation indicating distributions of polymerisation degree of polymers.

FIG. 2 shows distributions of polymerisation degree. Curve E shows the distribution of a polymer produced according to the present process, and curve F shows that according to a prior art process. It is well known that production of some polymers having extraordinarily high molecular weight cannot be avoided in a polymerisation during the course of which a gel effect is developed. According to the present process, however, the polymer obtained has a narrow distribution of polymerization degree and has uniform quality, as shown by curve E in FIG. 2.

The present invention, in general, is applicable to copolymerisation of styrene monomer and acrylonitrile monomer. As "styrene monomer," styrene itself and nuclear and/or side chain substituted styrenes such as lower alkyl substituted styrenes such as α-methylstyrene, vinyl toluenes, and chlorotoluenes may be used. As "acrylonitrile monomer," acrylonitrile itself and lower alkyl substituted acrylonitriles may be used. Any ratio of styrene monomer to acrylonitrile monomer may be used provided that the monomer mixture at the ratio in question can undergo suspension polymerisation. In addition to the above essential monomers, a small amount of other ethylenically unsaturated monomers copolymerisable therewith such as acrylic acid or its derivatives such as amides and lower alkyl esters, methacrylic acid or its derivatives such as amides and lower alkyl esters, vinylesters such as vinyl acetate may be introduced into the monomer mixture to be subjected to the suspension polymerisation according to the present process.

The suspension polymerisation process per se is well known. Any procedure can be employed provided that it assures suspension polymerisation of the monomer mixture in droplets dispersed in an aqueous phase. The polymerisation temperature is usually within a range of 50–100° C.

The following examples are given only to demonstrate a specific embodiment of the present invention. All quantities by "parts" are by weight.

Example 1

| Recipe—suspending medium: | Parts |
|---|---|
| Water | 100 |
| Copolymer of potassium methacrylate and methacrylate ester | 0.07 |
| Potassium ferricyanide | 0.1 |
| Sodium monohydrogenphosphate | 0.3 |
| Sodium dihydrogenphosphate | 1.5 |

| Recipe—monomers: | Parts |
|---|---|
| Monomers, Acrylonitrite/Styrene=30/70 | 100 |
| t-Dodecylmercaptan | 0.25 |
| Lauroyl peroxide | 0.6 |

Into a 120 l. autoclave provided with a stirrer, the above recipes were charged and were subjected to suspension polymerisation under stirring at 156 r.p.m. The polymerisation temperature was set at 80° C., and the polymerisation temperature was maintained at 80° C. by adjustment of jacket cooling. The temperature of the cooling water circulated through the jacket was 40° C. at the entrance of the jacket.

After 90 min., there were signs that the polymerisation temperature was about to rise. At that time, monomer conversion was 50%. Thereafter, the jacket temperature was held at 40° C. The temperature of the content of the autoclave rose rapidly to reach its maximum of 97° C. and was then lowered. The total reaction time required for the temperature of the content to decrease to 80° C. was 125 min.

After this polymerisation, the resulting polymer in the form of beads was washed and dried by conventional procedures. The amount of the polymer was 47.4 kg., which corresponds to a yield of 94.9% based on the monomer. The distribution of polymerisation degree was determined by gel permeation chromatography, and curve E in FIG. 2 was obtained.

Reference Example 1

In a 3-litre stainless-steel autoclave provided with a stirrer, 1250 parts each of the recipes of Example 1 were mixed, and the mixture was polymerised at 80° C. under stirring at 500 r.p.m. for 160 min. Thereafter, the temperature was elevated to 85° C. (60 minutes) and further polymerisation was carried out at this temperature.

Upon completion of the polymerisation, the autoclave was quenched and opened. The resulting polymer was washed with water and dried to produce 1180 parts $$\frac{1180}{1250} = 94.4\%$$

of beads. The distribution of polymerisation degree was determined by the procedure described in Example 1, and curve F in FIG. 2 was obtained.

Reference Example 2

In the case where the last step of polymerization carried out at 85° C. for 60 min., which was aging, was omitted in the reference example, and the polymer was removed directly after the polymerisation at 90° C. for 160 min., the yield of the resulting polymer was 91.5%.

Reference Example 3

Polymerisation was carried out at 80° C. with the same recipes of polymerisation and autoclave as set forth in Reference Example 1 except that the temperature was so controlled that the temperature profile shown by curve D in FIG. 1 was obtained.

That is, the polymerisation temperature was elevated at the early stage of the polymerisation from 80° C. to a maximum of 97° C. in 15 min., and was then lowered from 97° C. to 80° C. in 20 min., thereafter being held at 80° C. for 3 hrs. The convex temperature profile given at the early stage of the polymerisation was substantially the same as that found in the polymerisation in Example 1 after the gel effect had developed.

When the slurry in the autoclave was poured into water, the suspension state was destroyed and the product particles were aggregated. The conversion obtained was only 30%.

We claim:

1. In a process for aqueous suspension polymerization of a monomer mixture comprising principally a substituted or unsubstituted styrene monomer and a substituted or unsubstituted acrylonitrile monomer, the improvement which comprises (1) polymerizing at a polymerization vessel temperature so controlled by cooling means that the mixture does not exceed a predetermined temperature in the range of 50 to 100° C. until a gel effect begins to develop, and (2) then discontinuing cooling means and permitting the temperature of the mixture to rise autogeneously owing to the exotherm of the continuing polymerization.

2. A process as claimed in claim 1 wherein said predetermined temperature is maintained substantially constant until said gel effect begins to develop.

3. A process as claimed in claim 1 wherein said styrene is unsubstituted styrene monomer.

4. A process as claimed in claim 1 wherein said acrylonitrile is unsubstituted acrylonitrile monomer.

5. In a process for aqueous suspension polymerization of a monomer mixture comprising principally a substituted or unsubstituted styrene monomer and a substituted or unsubstituted acrylonitrile monomer, the improvement which comprises (1) polymerizing at a polymerization vessel temperature so controlled by cooling means that the mixture does not exceed a predetermined temperature in the range of 50 to 100° C. until a gel effect begins to develop, and (2) then maintaining a quantitative cooling rate in said cooling means substantially at the rate required prior to the onset of gel formation, thus permitting the temperature within the mixture to rise autogeneously owing to the exotherm of the continued polymerization.

References Cited

UNITED STATES PATENTS

| | | | |
|---|---|---|---|
| 2,775,579 | 12/1956 | Earchak et al. | 260—85.5 HC |
| 3,493,551 | 2/1970 | Aoishi et al. | 260—85.5 |

HARRY WONG, JR., Primary Examiner

U.S. Cl. X.R.

260—80.6, 80.73, 80.8, 80.81, 89.5 A, 92.8 W, 93.5 W